United States Patent
Nouvel et al.

(10) Patent No.: US 12,099,847 B2
(45) Date of Patent: Sep. 24, 2024

(54) TECHNIQUE FOR IMPROVING EFFICIENCY OF DATA PROCESSING OPERATIONS IN AN APPARATUS THAT EMPLOYS REGISTER RENAMING

(71) Applicant: Arm Limited, Cambridge (GB)

(72) Inventors: Quentin Éric Nouvel, Antibes (FR); Luca Nassi, Antibes (FR); Adrien Pesle, Roquefort les Pins (FR)

(73) Assignee: Arm Limited, Cambridge (GB)

( * ) Notice: Subject to any disclaimer, the term of this patent is extended or adjusted under 35 U.S.C. 154(b) by 39 days.

(21) Appl. No.: 18/101,726

(22) Filed: Jan. 26, 2023

(65) Prior Publication Data

US 2024/0256281 A1 Aug. 1, 2024

(51) Int. Cl.
*G06F 9/30* (2018.01)
*G06F 9/38* (2018.01)

(52) U.S. Cl.
CPC ..................... *G06F 9/384* (2013.01)

(58) Field of Classification Search
CPC ....................................... G06F 9/384
See application file for complete search history.

(56) References Cited

U.S. PATENT DOCUMENTS 6,094,716 A * 7/2000 Witt ......................... G06F 9/322
712/E9.034
10,528,355 B2 * 1/2020 Abernathy ............. G06F 9/384
(Continued)

FOREIGN PATENT DOCUMENTS

WO 2021/061224 4/2021

OTHER PUBLICATIONS

Combined Search and Examination Report for GB Application No. 2318349.4 dated Jun. 21, 2024, 6 pages.

*Primary Examiner* — Corey S Faherty
(74) *Attorney, Agent, or Firm* — NIXON & VANDERHYE P.C.

(57) ABSTRACT

A data processing apparatus comprises: execution circuitry to execute instructions in order to perform data processing operations specified by those instructions; a plurality of registers to store data values for access by the execution circuitry when performing the data processing operations, each register having an associated physical register identifier; register rename circuitry to select physical register identifiers to associate with architectural register identifiers specified by the instructions; and rename storage having a plurality of entries, each entry being associated with one of the architectural register identifiers and used by the register rename circuitry to indicate a physical register identifier selected for association with that one of the architectural register identifiers; the register rename circuitry comprising an execute unit, and being responsive to detection of an early execute condition for a given instruction, the early execute condition requiring at least detection that each source value required to execute the given instruction is available to the register rename circuitry without accessing the plurality of registers, to cause the execute unit to perform the data processing operation specified by the given instruction in order to generate a result value, and to cause the generated result value to be stored in an entry of the rename storage associated with a destination architectural register identifier specified by the given instruction.

19 Claims, 5 Drawing Sheets

(56) References Cited

U.S. PATENT DOCUMENTS

Figures 1, 2:
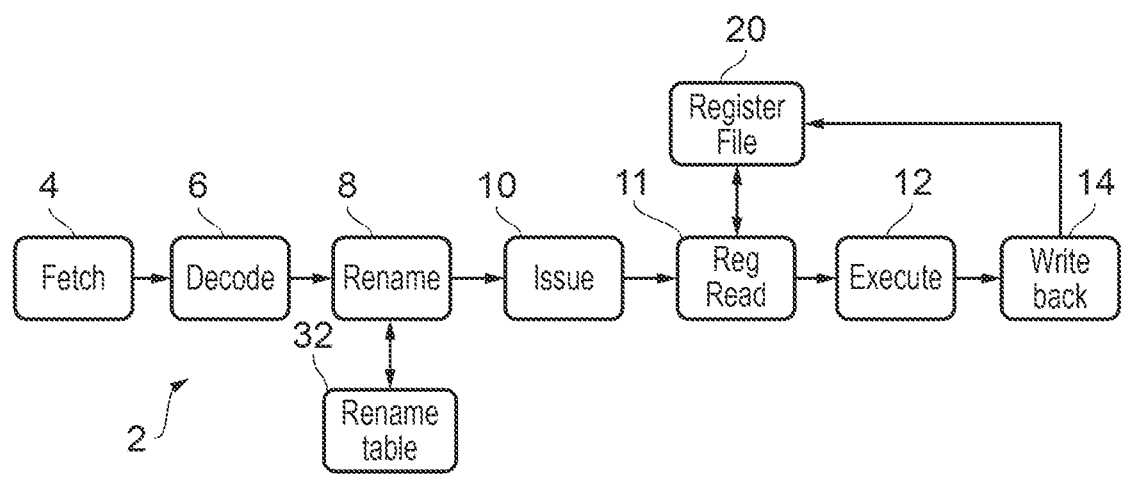

| | | | |
|---|---|---|---|
| 2014/0189324 A1* | 7/2014 | Combs | G06F 12/0292 |
| | | | 712/225 |
| 2016/0170770 A1* | 6/2016 | Cain, III | G06F 9/3832 |
| | | | 712/219 |
| 2019/0361705 A1 | 11/2019 | Nassi et al. | |
| 2020/0356372 A1* | 11/2020 | Al Sheikh | G06F 9/3802 |
| 2022/0156078 A1* | 5/2022 | Pusdesris | G06F 9/3838 |
| 2023/0195466 A1* | 6/2023 | Ishii | G06F 9/30181 |
| | | | 712/217 |

* cited by examiner

TECHNIQUE FOR IMPROVING EFFICIENCY OF DATA PROCESSING OPERATIONS IN AN APPARATUS THAT EMPLOYS REGISTER RENAMING

The present disclosure relates to the field of data processing. More particularly, the present disclosure relates to a technique that can enable data processing operations to be performed more efficiently within an apparatus that employs register renaming.

A data processing apparatus may support register renaming in which architectural register identifiers specified by instructions are associated with physical register identifiers for physical registers to be accessed in response to the instructions. Register renaming can be performed so as to remove dependencies between instructions that may arise from the reuse of architectural register identifiers in an instruction sequence to thereby improve parallelism. For example, so called false write-after-write (WAW) and write-after-read (WAR) dependencies can be removed using register renaming.

Whilst the use of register renaming can improve performance by removing dependencies between instructions, and thereby for example enable instructions to be executed out of program order, control signals defining the operations required to execute the instructions will need to be propagated through the data processing apparatus (which is often arranged in a pipelined manner) to enable the instructions to be executed by execution circuitry provided within the apparatus, and during performance of the data processing operations defined by those instructions the execution circuitry will typically access one or more registers used to store the data values required by the execution circuitry when performing the data processing operations. Execution of instructions in the above manner by the execution circuitry results in significant energy consumption, and it would be desirable to reduce that energy consumption where possible.

At least some examples provide a data processing apparatus comprising:
  execution circuitry to execute instructions in order to perform data processing operations specified by those instructions;
  a plurality of registers to store data values for access by the execution circuitry when performing the data processing operations, each register having an associated physical register identifier;
  register rename circuitry to select physical register identifiers to associate with architectural register identifiers specified by the instructions; and
  rename storage having a plurality of entries, each entry being associated with one of the architectural register identifiers and used by the register rename circuitry to indicate a physical register identifier selected for association with that one of the architectural register identifiers;
  the register rename circuitry comprising an execute unit, and being responsive to detection of an early execute condition for a given instruction, the early execute condition requiring at least detection that each source value required to execute the given instruction is available to the register rename circuitry without accessing the plurality of registers, to cause the execute unit to perform the data processing operation specified by the given instruction in order to generate a result value, and to cause the generated result value to be stored in an entry of the rename storage associated with a destination architectural register identifier specified by the given instruction.

At least some examples provide a data processing method comprising:
  detecting an early execute condition for a given instruction, the early execute condition requiring at least detection that each source value required to execute the given instruction is available to register rename circuitry without accessing registers storing data values for access by execution circuitry when performing data processing operations specified by instructions; and
  in response to detecting the early execute condition for the given instruction:
  performing, by an execute unit included in the register rename circuitry, a data processing operation specified by the given instruction in order to generate a result value, and writing the generated result value in an entry of rename storage, the entry being associated with a destination architectural register identifier specified by the given instruction, the rename storage comprising a plurality of entries, each entry being associated with one architectural register identifier specified by the instructions and capable of being used to indicate a physical register identifier selected for association with that one architectural register identifier.

At least some examples provide a computer-readable medium to store computer-readable code for fabrication of an apparatus comprising:
  execution circuitry to execute instructions in order to perform data processing operations specified by those instructions;
  a plurality of registers to store data values for access by the execution circuitry when performing the data processing operations, each register having an associated physical register identifier;
  register rename circuitry to select physical register identifiers to associate with architectural register identifiers specified by the instructions; and
  rename storage having a plurality of entries, each entry being associated with one of the architectural register identifiers and used by the register rename circuitry to indicate a physical register identifier selected for association with that one of the architectural register identifiers;
  the register rename circuitry comprising an execute unit, and being responsive to detection of an early execute condition for a given instruction, the early execute condition requiring at least detection that each source value required to execute the given instruction is available to the register rename circuitry without accessing the plurality of registers, to cause the execute unit to perform the data processing operation specified by the given instruction in order to generate a result value, and to cause the generated result value to be stored in an entry of the rename storage associated with a destination architectural register identifier specified by the given instruction.

Such computer-readable code can be disposed in any known transitory computer-readable medium (such as wired or wireless transmission of code over a network) or non-transitory computer-readable medium such as semiconductor, magnetic disk, or optical disc.

Figure 3:
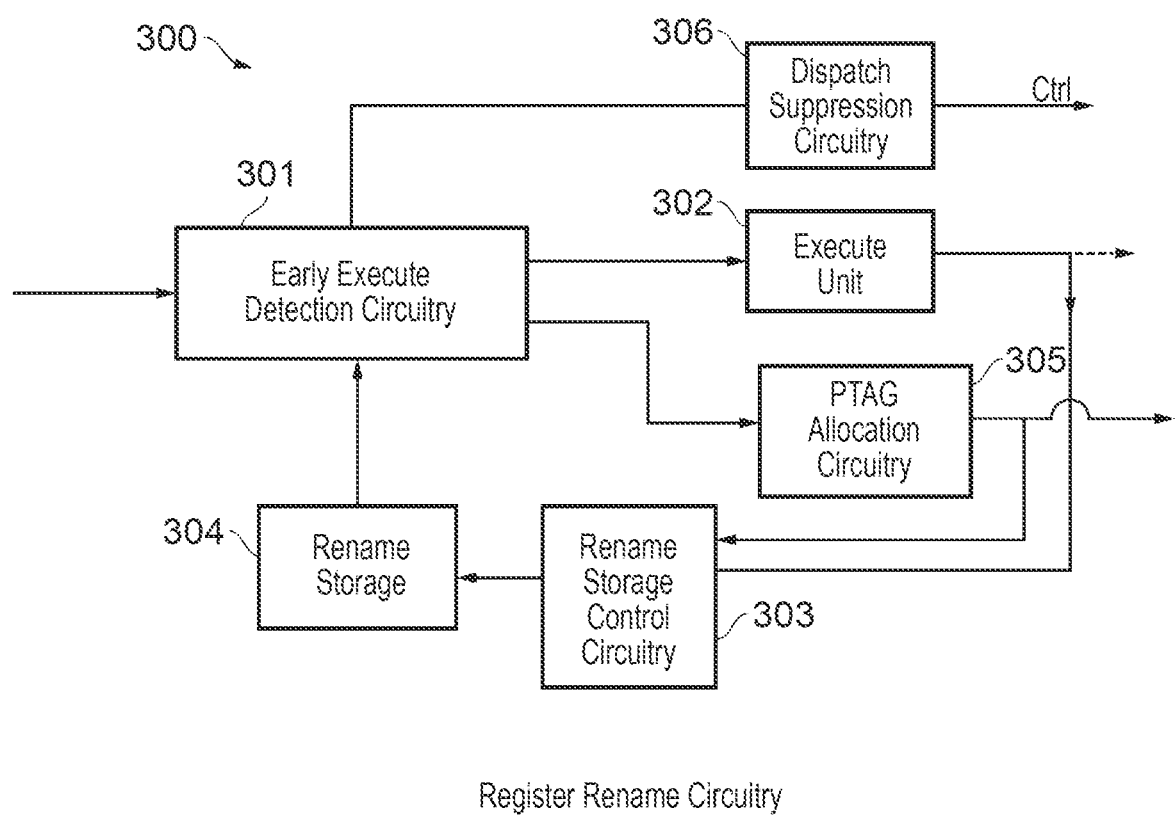
Figure 4:
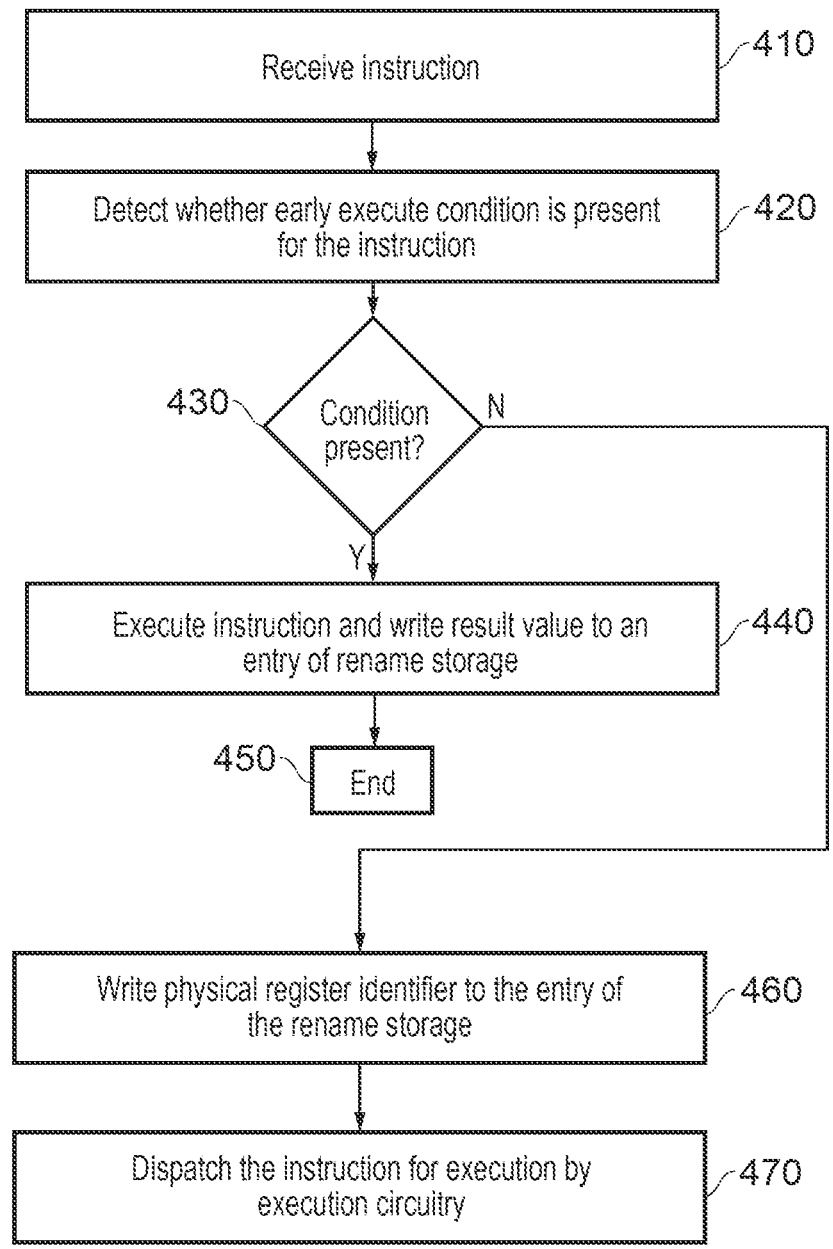
Figure 5:
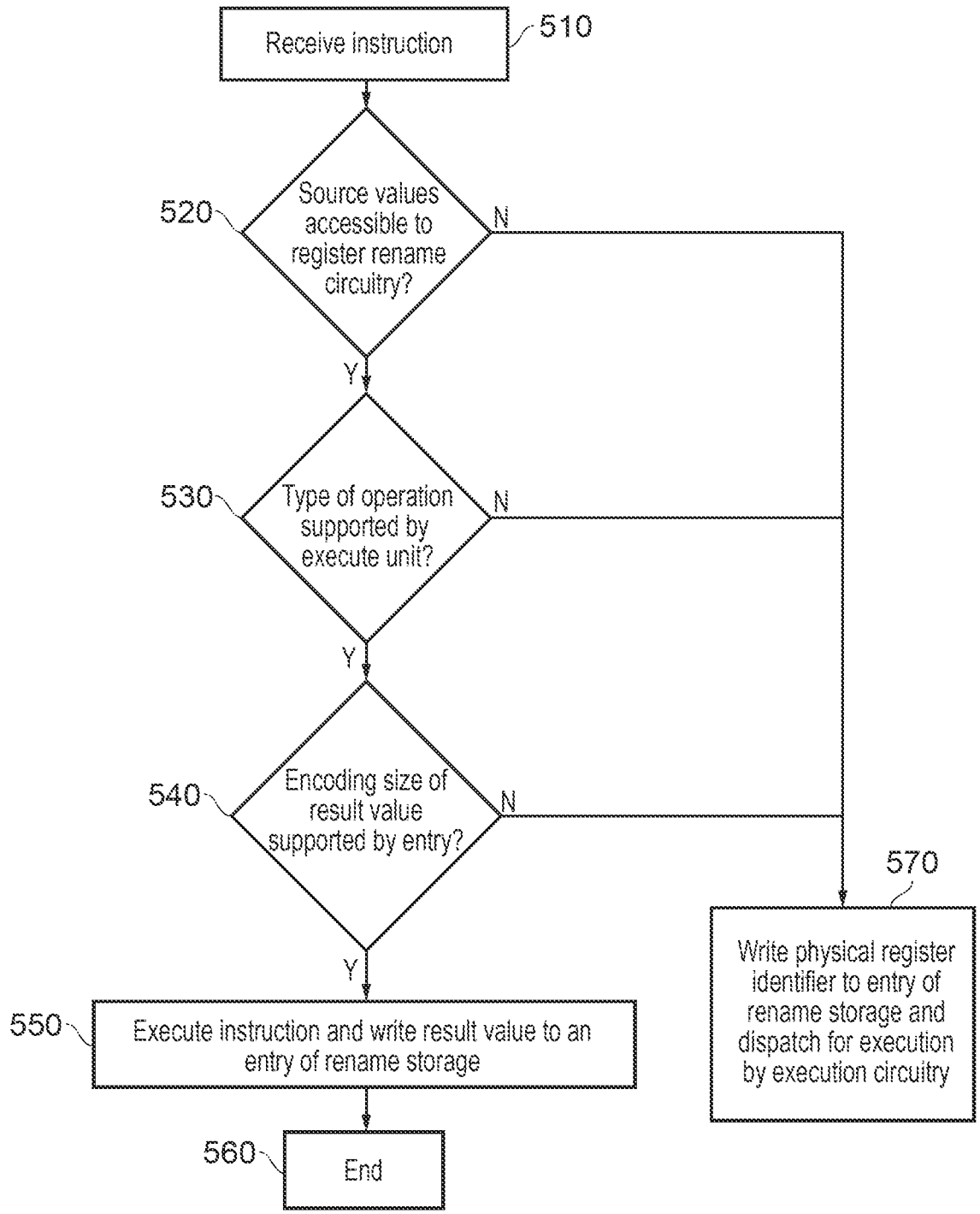
Figure 6:
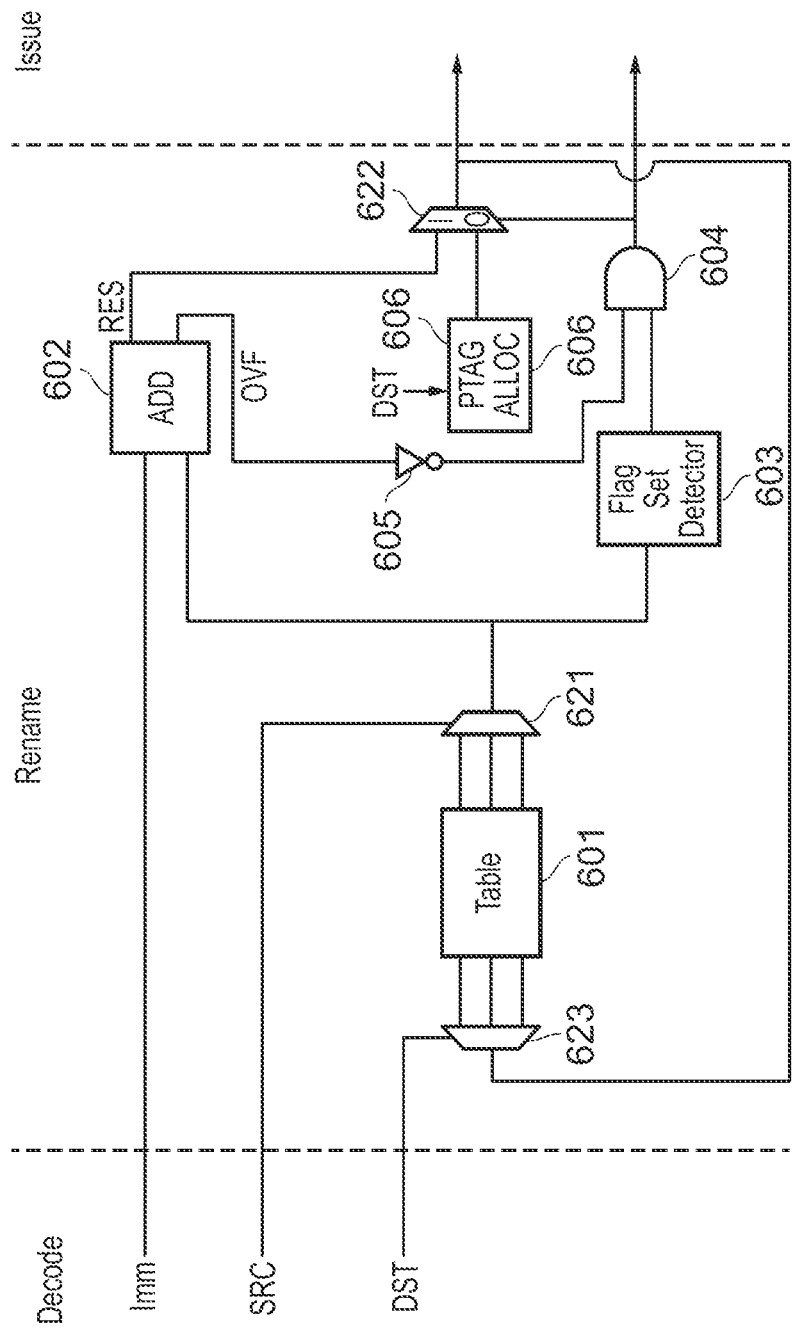

Further aspects, features and advantages of the present technique will be apparent from the following description of examples, which is to be read in conjunction with the accompanying drawings, in which:

FIG. 1 schematically illustrates a portion of a data processing apparatus for performing register renaming;

FIG. 2 schematically illustrates an example of a rename table for associating architectural register identifiers with physical register identifiers;

FIG. 3 schematically illustrates an example of register rename circuitry provided for a register rename stage of a processing pipeline;

FIG. 4 schematically illustrates a method of executing an instruction by an execute unit of register rename circuitry responsive to detection of an early execute condition;

FIG. 5 schematically illustrates a method of detecting the early execute condition; and FIG. 6 schematically illustrates another example of register rename circuitry provided for a register rename stage of a processing pipeline.

Some examples of the present technique will now be described below.

In accordance with one example implementation a data processing apparatus comprises:

execution circuitry to execute instructions in order to perform data processing operations specified by those instructions;

a plurality of registers to store data values for access by the execution circuitry when performing the data processing operations, each register having an associated physical register identifier;

register rename circuitry to select physical register identifiers to associate with architectural register identifiers specified by the instructions; and rename storage having a plurality of entries, each entry being associated with one of the architectural register identifiers and used by the register rename circuitry to indicate a physical register identifier selected for association with that one of the architectural register identifiers;

the register rename circuitry comprising an execute unit, and being responsive to detection of an early execute condition for a given instruction, the early execute condition requiring at least detection that each source value required to execute the given instruction is available to the register rename circuitry without accessing the plurality of registers, to cause the execute unit to perform the data processing operation specified by the given instruction in order to generate a result value, and to cause the generated result value to be stored in an entry of the rename storage associated with a destination architectural register identifier specified by the given instruction.

Register renaming can be performed to associate architectural register identifiers specified by instructions with physical register identifiers. The physical register identifiers indicate physical registers which are to be accessed when executing those instructions.

The data processing apparatus comprises the register renaming circuitry and rename storage for associating physical register identifiers with architectural register identifiers. The data processing apparatus also comprises the execution circuitry to execute instructions during which registers within the plurality of registers will be accessed depending on the physical register identifiers associated with the architectural register identifiers by the register rename circuitry and rename storage.

The inventors have identified that processing efficiency and energy consumption can be improved by providing the register rename circuitry with an execute unit to perform one or more data processing operations that may be specified by instructions. The inventors have identified that by providing such an execute unit, it is possible to execute at least some instructions at a rename stage of a processing pipeline and use entries of the rename storage for storing the generated result values.

Instructions can thus be executed at an earlier stage in a processing pipeline compared to the case in which execution of the instructions is performed by using the execution circuitry and by accessing the physical registers. Consequently, processing of a given instruction by other subsequent processing stages subsequent to the register rename circuitry can be suppressed, thus resulting in reduced energy consumption. In particular, for a given instruction that is executed by the execute unit, processing resources of the data processing apparatus used for processing of the given instruction can be reduced compared to cases in which the instruction needs to be propagated through the downstream stages of the processing pipeline subsequent to the rename stage in order to enable execution of the instruction using the execution circuitry later in the processing pipeline with reference to data values stored in the physical registers.

The inventors have identified that the rename storage, which typically comprises entries for storing physical register identifiers for register renaming purposes, can also be used for storing result values generated by the data processing operations performed by the execute unit. In response to an instruction specifying at least a destination architectural register identifier and a data processing operation to be performed, the execute unit can perform the data processing operation, conditional on the detection of the early execute condition indicating that each source value required for the instruction is available to the register rename circuitry without accessing the registers, in order to generate a result value and cause the generated result value to be written to an entry of the rename storage associated with the destination architectural register identifier.

The generated result value stored to the entry of the rename storage is then available to the register rename circuitry for use as a source value for other instructions. Therefore, data processing operations specified by other instructions can also be performed by the execute unit by using one or more source values, which may comprise one or more previously generated result values available in the entries of the rename storage. Therefore, use of processing resources of the data processing apparatus associated with later stages of the processing pipeline can also be suppressed for these instructions, thereby providing significant energy/power savings. For example, since execution by the execute unit uses source values available to the register rename circuitry without accessing the plurality of registers, a number of accesses to physical registers can be greatly reduced. In addition to this, use of other resources associated with subsequent stages in the processing pipeline, such as issue queue resources, can also be greatly reduced.

The execute unit is arranged to execute a given instruction in response to detection of the early execute condition for a given instruction. The early execute condition requires at least detection that each source value required to execute the given instruction is available to the register rename circuitry without accessing the plurality of registers. Hence, if the early execute condition is met, execution of the given instruction by the execute unit can thus be performed at the rename stage with no register accesses being performed for the execution of the given instruction.

Execution of the given instruction by the execute unit requires one or more source values to be available to the register rename circuitry. A required source value may be an immediate value specified by the given instruction itself. Alternatively or in addition, a required source value may be a value stored in an entry of the rename storage. In one example implementation, the detection of the early execute condition thus comprises detection for each source value of whether that source value is available to the register rename circuitry as either an immediate value or a value stored in the rename storage.

In some examples, the data processing apparatus further comprises early execute condition detection circuitry configured to determine whether the early execute condition is present for the given instruction;
wherein the register rename circuitry is provided in a given pipeline stage of a pipelined processor, and in the presence of the early execute condition the early execute condition detection circuitry is arranged to suppress processing of the given instruction by one or more pipeline stages subsequent to the given pipeline stage.

The early execute condition detection circuitry can be configured to detect, for each of one or more source values required by the execute unit to execute the given instruction, whether each source value is available to the register rename circuitry without accessing the plurality of registers. The early execute condition detection circuitry may detect whether a required source value is available as either an immediate value specified by the given instruction or a value stored in an entry of the rename storage. In response to detecting presence of the early execute condition for the given instruction, the execute unit is configured to execute the given instruction by performing the data processing operation specified by the given instruction using the one or more source values available to the register rename circuitry without accessing the plurality of registers. The result value is thus generated and stored to the rename storage and available for use by the execute unit for execution of other instructions.

The register rename circuitry is provided in a given pipeline stage earlier in the processing pipeline than a stage at which execution by the execution circuitry is performed. In response to detection of the early execute condition for the given instruction, the execute unit is configured to perform the data processing operation specified by the given instruction. Also, in response to detection of the early execute condition for the given instruction, processing of the given instruction by one or more subsequent stages of the processing pipeline (being subsequent to the register rename circuitry) is suppressed. Use of processing resources associated with the one or more subsequent stages of the processing pipeline by the given instruction can thus be suppressed and improvements in processing efficiency and energy consumption associated with execution of the given instruction is achieved compared to a comparative case in which register renaming and dispatching of control signals (including physical register identifiers) to one or more pipeline stages subsequent to the register rename circuitry is performed in order to allow the data processing operation defined by the given instruction to be performed by the execution circuitry in the execute stage of the processing pipeline.

In some examples, the execute unit is capable of performing one or more data processing operations, the one or more data processing operations being a subset of the data processing operations capable of being performed by the execution circuitry; and the detection of the early execute condition for the given instruction by the early execute condition detection circuitry further requires detection that the data processing operation specified by the given instruction is one of the one or more data processing operations capable of being performed by the execute unit.

The execution circuitry may support a greater range of data processing operations than the execute unit of the register rename circuitry, in which some of the data processing operations supported by the execution circuitry are also supported by the execute unit. Therefore, a subset of the data processing operations capable of being performed by the execution circuitry are capable of being performed by the execute unit and are thus available at the stage of the processing pipeline associated with the register rename circuitry. For example, the execution circuitry may support different types of processing operation, and the execute unit may support one or more of the different types of processing operation, such that some types of data processing operation supported by the execution circuitry are supported by the execute unit. This can allow the execute unit to occupy a smaller area of circuitry and be operated with lower energy/power consumption compared to the execution circuitry.

In addition to requiring detection that each source value required to execute the given instruction is available to the register rename circuitry without accessing the plurality of registers, the detection of the early execute condition may also comprise detection that the data processing operation specified by the given instruction corresponds to one of the one or more data processing operations capable of being performed by the execute unit. Hence, two sub-conditions may be evaluated for detecting the early execute condition and, if at least one sub-condition is not present, then presence of the early execute condition is not detected.

Detection of whether each source value required to execute the given instruction is available to the register rename circuitry without accessing the plurality of registers may be performed first, followed by detection of whether the data processing operation specified by the given instruction is one of the one or more data processing operations capable of being performed by the execute unit. Alternatively, the two detections may be performed so that detection of whether the data processing operation specified by the given instruction is one of the one or more data processing operations capable of being performed by the execute unit is performed first, or the two detections may be performed at overlapping times, or in parallel.

Consequently, in response to detection of the early execute condition for the given instruction, the execute unit can be configured to perform the data processing operation specified by the given instruction and generate the result value. However, when the early execute condition is not detected for the given instruction, the data processing operation specified by the given instruction can instead be performed by the execution circuitry at the later stage in the processing pipeline based on physical register identifiers selected by the register rename circuitry. Use of the two sub-conditions improves the reliability of the detection of the early execute condition for indicating whether the given instruction is to be executed at the execute stage and suppressed from being processed by other subsequent stages of the processing pipeline.

In some examples, the detection of the early execute condition for the given instruction by the early execute condition detection circuitry further requires presence of a result fit condition, the result fit condition requiring that a number of bits provided by the entry of the rename storage associated with the destination architectural register identifier is sufficient to store the result value.

The rename storage comprises entries associated with the architectural register identifiers that are capable of being specified by the instructions. The entries each have a size such that they support storage of a given number of bits capable of indicating at least physical register identifiers for specifying physical registers so as to allow association of physical and architectural register identifiers. The execute unit performs data processing operations and uses the entries of the rename storage for storing the generated result values. For example, an entry may be used at one point in time to store a physical register identifier and later used at another point in time to store a result value generated by the execute unit (or vice versa). Therefore, a condition of whether a generated result value will fit within the number of bits provided by an entry of the rename storage can be used as a third sub-condition for detecting the early execute condition for an instruction.

In addition to requiring presence of the two sub-conditions described previously, the detection of the early execute condition may hence further require presence of a result fit condition for the result value for the given instruction. If at least one condition is not present, then presence of the early execute condition is not detected. Use of the three sub-conditions improves the reliability of the detection of the early execute condition for indicating whether the given instruction is to be executed at the execute stage and suppressed from being processed by other subsequent stages of the processing pipeline.

Specifically, the result value generated for the given instruction is to be stored to an entry of the rename storage associated with a destination architectural register identifier specified by the given instruction. Hence, a detection of whether the number of bits provided by the entry of the rename storage associated with the destination architectural register identifier specified by the given instruction is sufficient to store the result value can be used as the third sub-condition. In some cases, the detection of the result fit condition for an instruction can be performed prior to the execute unit performing the data processing operation specified by the instruction, whilst in other cases the detection of the result fit condition may occur after the execute unit has performed the data processing operation.

As mentioned above, in some examples, the presence of the result fit condition can be determined prior to the execute unit performing the data processing operation, and thus prior to the result value being generated. Therefore, rather than requiring the execute unit to firstly generate the result value and then determine the result fit condition, which represents wasteful use of processing resources when the generated value is subsequently determined to not satisfy the result fit condition, the result fit condition can be evaluated so that the processing resources of the execute unit are used more efficiently thereby conserving power.

In some examples, the early execute condition detection circuitry is arranged to determine, prior to the execute unit performing the data processing operation specified by the given instruction, whether the result fit condition is present in dependence on at least one of the operation type associated with the data processing operation specified by the given instruction, and at least one source value used when executing the given instruction.

An operation type associated with the data processing operation specified by the given instruction may be used for determining whether the result fit condition is present. For example, when the operation type associated with the data processing operation corresponds to an operation type that generates a result value that is smaller than or equal to a source value, then presence of the result fit condition may be able to be determined prior to the execute unit performing the data processing operation. For example, if the source value required for the execution of the given instruction is a value already stored by an entry of the rename storage and the operation type associated with the data processing operation corresponds to an operation type that generates a result value smaller than or equal to the source value, then presence of the result fit condition can be determined prior to the execute unit performing the data processing operation. Similarly, if the source value required for the execution of the given instruction is an immediate value, then in response to determining that a size of the immediate value is supported by the entry of the rename storage and that the data processing operation corresponds to an operation type that generates a result value smaller in size than, or equal in size to, the source value, then presence of the result fit condition can be determined prior to the execute unit performing the data processing operation. Whilst in the above example reference to the operation generating a smaller result has been made by way of illustration, the same principles may also apply to operations that will generate a result that is a predictable amount larger than the source value, if it can be determined that the source value is smaller than the maximum value that can be stored within an entry of the rename storage by at least that predictable amount. By way of explicit example, an add operation may add 1 to a source value, and if that source value is at least one less than the maximum value that can be stored, it can be determined that the fit condition is met prior to performing the add operation. More generally, an add operation that adds two N-bit numbers can at most result in a result value having N+1 bits, and hence if the two N-bit numbers are of a size that is at least one bit smaller than a number of bits that can be stored (i.e. the number of bits that can be stored is N+1 or more), it can be determined that the fit condition is met prior to performing the add operation.

In some alternative examples, the early execute condition circuitry is arranged, when determination of the presence of the result fit condition requires the data processing operation specified by the given instruction to be performed, but all other requirements for the early execute condition have been detected, to trigger the execute unit to perform the data processing operation specified by the given instruction in order to generate the result value, and to determine that the early execute condition is present when the result fit condition is determined to be present based on the result value.

In some cases, determining the presence of the result fit condition may require the data processing operation specified by the given instruction to firstly be performed so that determining the result fit condition can be performed based on the generated result value. Hence, in some cases a preliminary detection of the early execute condition may comprise detecting that each source value is available to the register rename circuitry without accessing the plurality of registers (and optionally whether the data processing operation is supported by the execute unit), and if so the data processing operation is performed with the determining of the result fit condition (and hence the actual presence of the early execute condition) being deferred until after the data processing operation has been performed.

In some cases, the operations for determining the result fit condition may be simplified when performed using the generated result value compared to when performed prior to the execute unit executing the instruction. In particular, for some cases involving a number of variables more complexity may be involved in determining the result fit condition based on an operation type and one or more source values prior to execution by the execute unit compared to determining the result fit condition based on the generated result value. Hence, processing efficiency can potentially be improved by instead determining the result fit condition based on the generated result value.

In some examples, each of the plurality of entries in the rename storage supports a given number of bits that is greater than a number of bits required for specifying the physical register identifiers for the plurality of registers.

As mentioned previously, each entry of the rename storage is associated with an architectural register identifier and supports a given number of bits capable of indicating at least a physical register identifier for specifying a physical register. In some examples, each entry in the rename storage supports a number of bits exceeding what is required for specifying the physical register identifiers for the plurality of registers. Entries of the rename storage may thus support one or more additional bits in addition to what is required for storing the physical register identifiers. When such an entry stores a physical register identifier, the one or more additional bits may for example correspond to the least significant bits or most significant bits and may be considered unused. However, when such an entry is used for storing a result value generated by the execute unit, one or more of the additional bits may be used for storing the result value.

By providing additional bits (additional to what is needed for specifying the physical register identifiers for the plurality of registers) for each of the plurality of entries in the rename storage, a likelihood of determining the presence of the result fit condition for an instruction is improved. Hence, for a sequence of instructions processed by the data processing apparatus, a likelihood of the determining the presence of the result fit condition is improved for an individual instruction, and a greater number of the instructions can be executed by the execute unit resulting in improvements in processing efficiency and reduced energy consumption.

In some examples, the register rename circuitry is responsive to absence of the early execute condition for the given instruction, to select a physical register identifier to associate with a destination architectural register identifier specified by the given instruction and write the physical register identifier to the entry of the rename storage associated with the destination architectural register identifier, and wherein the register rename circuitry is configured to dispatch the physical register identifier selected for the given instruction to a processing stage subsequent to the register rename circuitry to enable the execution circuitry to perform the data processing operation specified by the given instruction in order to generate the result value.

Presence of the early execute condition may not be detected for some instructions. For example, each source value required for execution of such an instruction may not be available to the register rename circuitry. In this case, the register rename circuitry can be configured to select a physical register identifier for the destination architectural register identifier and store the physical register identifier to the entry of the rename storage associated with the destination architectural register identifier. In addition, dispatch of physical register identifiers for the instruction to one or more subsequent stages of the processing pipeline is performed for facilitating execution of the instruction using the execution circuitry and by accessing the plurality of registers. Therefore, in this case the rename storage is used for storing a physical register identifier, and execution of the instruction is performed later in the processing pipeline using the execution circuitry. Therefore, for instructions for which execution by the execute unit is not permitted, physical register identifiers can be selected, stored in the rename storage and dispatched for permitting execution of theses instructions using data values stored in the plurality of registers.

In some examples, the execute unit comprises an arithmetic logic unit configured to perform an arithmetic operation. The execute unit may comprises an arithmetic logic unit supporting one or more arithmetic operations. Examples of supported arithmetic operations may be one or more of: addition operations; subtraction operations; multiplication operations; division operations; and raise to the power operations. Hence, the execute unit can perform an arithmetic operation specified by an instruction to calculate a result value. For example, an instruction may require a single source value (an immediate value or value in the rename storage) and the execute unit may perform an arithmetic operation specified by that instruction to add the source value to itself and store the result value to the rename storage. Similarly, a subtraction operation or multiplication operation may be performed. In some cases, arithmetic operations may be performed using two or more source values comprising immediate values and/or values in the entries of the rename storage.

In some examples, the arithmetic logic unit comprises at least one of adder circuitry, subtractor circuitry and adder-subtractor circuitry. As mentioned above, the execute unit may support a subset of the data processing operations capable of being performed by the execution circuitry. In some examples, the execute unit may support only one or more of addition type arithmetic operations and subtraction type arithmetic operations. Hence, whereas the execution circuitry may support a range of arithmetic operations, the arithmetic operations available at the execute unit may be more limited, and in some examples specifically limited to only addition and/or subtraction operations. This can allow the execute unit to occupy a significantly smaller circuit area compared to cases in which the execute unit provides more complex functionality, whilst also allowing simplified operation and relatively low power consumption by the execute unit.

The provision of the execute unit supporting only addition and/or subtraction operations can be well suited for use with the rename storage due to the number of bits supported by the entries of the rename storage. Arithmetic operations using subtraction operations for positive source values produce result values smaller in size than the source values (or of a same size in the case of a subtraction of a zero value) and are thus likely to be capable of being stored by the entries of the rename storage. Similarly, arithmetic operations using addition operations (or subtraction operations performing subtraction of a negative source operand) may produce result values of sufficiently similar size to the source values that there is a high likelihood of the result value fitting in an entry of the rename storage compared to, for example, multiplication or raise to the power operations. Hence, the combination of such an execute unit with rename storage for which the entries support a certain number of bits, achieves efficient use of circuit area with an improved likelihood that the result fit condition will be present for the result values.

In some examples, the detection that each source value required to execute the given instruction is available to the register rename circuitry comprises detection that each source value required to execute the given instruction is one of an immediate value specified by the given instruction and a value stored in an entry of the rename storage associated with a source architectural register identifier specified by the given instruction.

In some examples, in response to the given instruction specifying a source architectural register identifier, the execute unit is configured to perform the data processing operation specified by the given instruction using a source value previously written to an entry of the rename storage associated with the source architectural register identifier.

In some examples, in response to the given instruction specifying an immediate value, the execute unit is configured to perform the data processing operation specified by the given instruction using the immediate value.

In some examples, in response to the given instruction specifying a first source architectural register identifier and a second source architectural register identifier, the execute unit is configured to perform the data processing operation specified by the given instruction using a first source value previously written to an entry of the rename storage associated with the first source architectural register identifier and a second source value previously written to an entry of the rename storage associated with the second source architectural register identifier.

In some examples, the given instruction is an instruction that evaluates one or more condition codes based on values of one or more condition flags stored in a condition flag rename storage within the register rename circuitry.

The register rename circuitry may also comprise condition flag rename storage. The condition flag rename storage comprises at least one entry which can be used to store one or more condition flags. Hence, at the stage of the processing pipeline associated with the register rename circuitry, condition codes and condition flags can be available to the register rename circuitry, and thus without accessing one or more downstream condition flag registers accessible to the execution circuitry. A given instruction may thus be executed by the execute unit of the register rename circuitry to evaluate one or more condition codes based on one or more condition flags.

The given instruction may be one of a first type of instruction and a second type of instruction. The first type of instruction may be an instruction specifying a data processing operation that is performed conditionally, dependent on whether one or more condition flags stored by the condition flag rename storage meet a specified condition, and if the condition is met the data processing operation is performed in order to generate a result value to be stored to the rename storage. Execution of the first type of instruction by the execute unit may require source values to be available to the register rename circuitry, of which at least one of the source values is a condition code value to be evaluated based on at least one condition flag stored by the condition flag rename storage, and a result value generated for the first type of instruction can be stored to an entry of the rename storage associated with the destination architectural register identifier specified by the first type of instruction. Therefore, whether the data processing operation specified by the first type of instruction is performed by the execute unit may be conditional on one or more condition code values and one or more condition flags. The second type of instruction may be an instruction specifying a data processing operation for generating one or more condition flags to be stored to the condition flag rename storage. For example, the second type of instruction may in some cases be a condition-flag-setting instruction for setting one or more condition flags. These two types of instruction are thus both capable of being executed by the execute unit of the register rename circuitry in one example implementation.

In some examples, the given instruction is arranged to update at least one of the one or more condition flags stored in the condition flag rename storage within the register rename circuitry based on evaluation of one or more source values that are available to the register rename circuitry without accessing the plurality of registers. In the case where the given instruction is the second type of instruction, responsive to detection of the early execute condition for the given instruction, the execute unit can execute the given instruction to perform the data processing operation specified by the given instruction, in which the execute unit is caused to generate at least one result value which is a condition flag and store the condition flag to an entry of the condition flag rename storage. Therefore, instructions can be executed at the stage of the processing pipeline associated with the register rename circuitry to update condition flags available to the register rename circuitry without accessing the plurality of registers.

Particular examples of the techniques described herein will now be discussed with reference to the figures.

FIG. 1 schematically illustrates an example of a portion of a processing pipeline in a data processing apparatus 2. The processing pipeline includes a number of stages including a fetch stage 4, a decode stage 6, a rename stage 8, an issue stage 10, a register read stage 11, an execute stage 12 and a write back stage 14. Instructions to be processed are fetched at the fetch stage from one or more instruction caches and/or memory. The instructions are decoded at the decode stage 6 to generate control signals for the instructions. The decoded instructions (specifically, the control signals for the decoded instructions) move from stage to stage, and one instruction may be pending at one stage of the pipeline while another instruction is pending at a different stage. It will be appreciated that this is just one example of a possible pipeline and other examples may have other stages or arrangements.

For some instructions, a single instruction fetched from memory may be decoded into a single decoded instruction passed down the pipeline. However, for other more complex instructions, a single fetched instruction may be decoded into multiple decoded instructions known as "micro-operations". For example, an instruction for triggering a series of operations to be performed (such as a load multiple instruction) may be decoded into individual micro-operations each corresponding to one of the operations. Therefore, the "instructions" as seen by the later stages 8, 10, 11, 12, 14 of the pipeline may be different from the instructions fetched from memory and the term "instruction" should be interpreted as encompassing a micro-operation.

As shown in FIG. 1, a rename table 32 can be accessed at the rename stage 8. The rename table 32 comprises entries for associating architectural register identifiers and physical register identifiers specifying physical registers in the physical register file 20 (also referred to as a register array).

The rename stage 8 can be used for mapping architectural register identifiers specified by the instructions to physical register identifiers. Specifically, at the rename stage 8, register rename circuitry is operable to select physical register identifiers to associate with architectural register identifiers specified by the instructions, and update the entries of the rename table 32 with the selected physical register identifiers to indicate physical register identifiers that are selected for association with the architectural register identifiers. Hence, in response to receiving an instruction for which the rename table does not currently associate a physical register identifier with the architectural register identifier specified by the instruction, the register rename circuitry can select a physical register identifier and update the rename table 32 to populate an entry with the selected physical register identifier.

The physical register file 20 can support a greater number of physical registers than a number of architectural register identifiers that can be specified by the instructions of an instruction set architecture (ISA). The instruction set architecture (ISA) may for example support a certain number of architectural registers which are visible to a programmer. For example, a 4- or 5-bit register field in the instruction encoding may specify one of 16 or 32 different architectural register specifiers. Register renaming can thus be performed at the rename stage 8 to rename instructions and potentially remove dependencies between instructions that may arise from the reuse of architectural register identifiers in an instruction sequence to thereby improve parallelism. For example, so called false write-after-write (WAW) and write-after-read (WAR) dependencies can be removed using such register renaming.

The physical register file 20 comprises a number of physical registers for storing data values for use at the execute stage 12. Data values stored by the physical register file can be accessed by execution circuitry at the execute stage 12 for performing data processing operations and generating result values that can be written to physical registers in the physical register file 20. The execution circuitry used at the execute stage 12 may include various processing units (e.g. functional units) for executing processing operations in response to instructions. For example, the processing units may include an arithmetic/logic unit (ALU) for performing arithmetic or logical operations, a load/store unit to perform load operations for loading a data value from memory and placing it in a physical register or store operations for storing to memory a data value currently stored in a physical register, a vector processing unit for performing vector operations on data values comprising multiple data elements, floating-point circuitry for performing operations on floating-point values, or any other type of processing circuitry.

When execution of the instruction is complete at the execute stage 12, the instruction is passed to the write-back stage 14, which writes a generated result value for the instruction to a physical register in the physical register file 20. The result value can thus be stored and potentially used as a source operand by other subsequent instructions.

For instructions for which physical register identifiers are specified at the rename stage 8, issue queue circuitry can be provided at the issue stage 10 for queuing such instructions while awaiting execution by the execution circuitry at the execute stage 12. Instructions remain in one or more issue queues until their operands are available to the execution circuitry, at which point the instruction is issued to the execute stage 12 for execution. Instructions may be issued for execution in a different order to the original program order in which they were fetched by the fetch stage 4. For example, while one instruction is stalled because its operands are not yet available, a later instruction whose operands are available may be issued first.

In the example shown in FIG. 1, the reading of the physical registers may take place at the register read stage 11. However, other embodiments may read the physical registers while the instruction is pending in an issue queue at the issue stage 10 or at the execute stage 12 instead.

For a given instruction, both the source and destination architectural register identifiers specified by the given instruction may be associated with physical register identifiers at the rename stage 8.

Hence, instructions can be executed by execution circuitry at the execute stage 12 in order to perform data processing operations specified by those instructions by accessing data values stored by the physical registers of the physical register file 20.

However, the inventors have identified that improvements in processing efficiency, energy/power consumption and processing performance can be achieved by providing register rename circuitry comprising an execute unit to perform data processing operations at the rename stage 8. In particular, by providing register rename circuitry comprising an execute unit, at least some instructions can be executed at the rename stage 8 (rather than being executed by the execution circuitry at the execute stage 12) to perform data processing operations earlier in the processing pipeline and generate result values to be written to the rename table 32. This can provide a number of performance and energy consumption improvements. In particular, use of processing resources later in the processing pipeline (that is, at stages that are subsequent to the rename stage 8 in the processing pipeline) which would have otherwise been utilised for a given instruction can be suppressed. For example, a number of accesses to the physical register file 20 can be reduced, as can the use of other resources such as issue queue resources for queuing instructions for execution at the execute stage. In addition to freeing up these resources for use in the handling of other instructions, thereby potentially improving throughput/performance, this can also reduce energy consumption associated with executing an instruction sequence compared to a comparative example in which each instruction is executed at the execute stage and result values are written to the physical register file 20.

The inventors have identified that the entries of the rename table 32, which typically may store just physical register identifiers for use in register renaming, can be written to by the execute unit to store result values generated by the execute unit. Result values can thus be generated by the execute unit at the rename stage 8 and written to entries of the rename table 32. Specifically, a result value generated for an instruction can be written to an entry of the rename table 32 associated with a destination architectural register identifier specified by that instruction. Therefore, rather than the result value being generated at the execute stage 12 and written to a physical register of the physical register file 20, the result value can be generated and written to the rename table 32 and thus accessible to the execute unit for performing data processing operations for subsequent instructions at the rename stage 8. If such a subsequent instruction does not meet the early execute condition but does specify a source architectural register identifier for which the rename table stores a source value, that source value can still be read from the rename table and passed down the pipeline with the other control signals defining the operation to be performed at the execute stage 12 in order to execute that subsequent instruction.

Execution of a given instruction by the execute unit of the register rename circuitry (and thus at an earlier stage in the processing pipeline than the execute stage 12) is dependent on whether the above-mentioned early execute condition is present for the given instruction. Depending on whether the early execute condition is detected for a given instruction, the given instruction is executed by the execute unit of the register rename circuitry or a physical register identifier is selected and operations performed to facilitate execution of the given instruction by execution circuitry later in the processing pipeline at the execute stage 12.

The early execute condition for a given instruction requires at least that each source value to be used for the execution of the given instruction is available to the register rename circuitry without accessing the physical registers of the physical register file 20. The given instruction may use a source value that is one of an immediate value specified directly by the given instruction or a value already stored in an entry of the rename table 32. For example, the execute unit may perform a data processing operation using a single source value, such as adding the source value to itself, or multiplying the source value with itself, or performing a square root operation. The given instruction may use two or more source values comprising one or more of an immediate value and a value stored in an entry of the rename table 32. Hence, a detection of an early execute condition for the given instruction, comprising detection of whether each of one or more source values required for the execution is available to the register rename circuitry, is used to determine whether to execute the given instruction using the execute unit.

In response to detecting presence of the early execute condition, the given instruction can be executed and the generated result value written to the entry of the rename table 32 associated with the destination architectural register identifier specified by the given instruction. In response to absence (not detecting the presence of the early execute condition) of the early execute condition, the register rename circuitry instead selects a physical register identifier and stores the physical register identifier in the entry of the rename table 32 associated with the destination architectural register identifier specified by the given instruction. The physical register identifier can thus be stored in the rename table 32 and also dispatched to other later stages of the processing pipeline so that the data processing operation specified by the given instruction can instead be performed by the execution circuitry at the execute stage 12 to generate the result value and write the result value to a physical register in the physical register file 20 which is specified by the physical register identifier.

Therefore, execution by the execute unit can be selectively performed for at least some instructions of an instruction sequence for which the presence of the early execute condition is detected. For an instruction executed by the execute unit, processing of that instruction by other stages subsequent to the rename stage 8 can thus be suppressed resulting in reduced energy/power consumption for the data processing apparatus 2, and in some instances performance/throughput improvements. In particular, provision of signals associated with that instruction from the register rename circuitry to circuitry associated with other subsequent stages can be suppressed. This is discussed in more detail later.

More generally, the register rename table 32 can thus be used for storing physical register identifiers as well as result values generated by the execute unit. FIG. 2 schematically illustrates an example of the rename table 32. The rename table 32 comprises an architectural register identifier field 210 including entries for each of the architectural register identifiers that can be specified by the instructions (in some implementations the architectural register identifier field may be an implicit field rather than an explicit field, e.g. where a given entry is always associated with a specific architectural register identifier). The rename table 32 also comprises a physical register identifier field 220 including entries for storing physical register identifiers. In the example shown, the entry in the physical register identifier field which is associated with the architectural register identifier A0 stores a result value Val1 that has been generated by a data processing operation performed by the execute unit. Similarly, the entry in the physical register identifier field which is associated with the architectural register identifier A2 stores another result value Val2 that has been generated by a data processing operation performed by the execute unit. The entry in the physical register identifier field which is associated with the architectural register identifier A1 stores a physical register identifier P35 for specifying a physical register in the physical register file 20. Therefore, a respective entry may store one of a result value and a physical register identifier. The rename table 32 thus comprises entries capable of storing one of a result value and a physical register identifier at given point in time.

The rename table 32 may also comprise a flag field 230 (shown on the right in FIG. 2) comprising entries for storing a flag value to indicate whether an associated entry in the physical register identifier field currently stores a result value or a physical register identifier. In the example shown in FIG. 2, a flag value of 1 indicates presence of a result value and a flag value of 0 indicates presence of a physical register identifier. Whilst the flag field is schematically shown as a separate field in FIG. 2, in some examples the flag field may be incorporated within the physical register identifier field, for example by predetermined bit positions in the physical register identifier field being used to indicate presence or absence of result values.

FIG. 3 schematically illustrates a detailed view of an example of the register rename circuitry. In the example of FIG. 3, the register rename circuitry 300 comprises early execute detection circuitry 301, an execute unit 320, rename storage control circuitry 303, rename storage 304, PTAG (physical tag) allocation circuitry 305 and dispatch suppression circuitry 306.

The early execute detection circuitry 301 is configured to detect presence of an early execute condition for a given instruction. As explained above, this detection comprises at least a detection of availability, to the register rename circuitry, of each of the one or more source values required to execute the given instruction without accessing the physical register file. The detection by the early execute detection circuitry 301 may comprise detecting whether each source value is an immediate value specified by the given instruction. In response to detecting that each source value is an immediate value, the early execute detection circuitry 301 detects the presence of the early execute condition for the given instruction, subject to any other requirements for the early execute condition being met. In some cases, the detection may comprise detecting whether each entry of the rename storage 304 associated with each source architectural register identifier specified by the given instruction comprises a result value. In particular, a look-up operation with respect to the flag field 230 in the rename table may be performed. In some cases, the early execute detection circuitry 301 may firstly detect for each of the one or more source values, whether the source value is an immediate value or a result value, and in response to detecting that a source value is a result value, then perform a look-up operation to look-up a flag value indicating whether the results value is available by accessing the rename table 32.

In response to detecting the early execute condition for the given instruction, the early execute detection circuitry 301 is operable to provide the instruction to the execute unit 302 for execution. The execute unit 302 thus performs the data processing operation specified by the given instruction to generate the result value. As shown in FIG. 3, the result value from the execute unit 302 is provided to the rename storage control circuitry 303. Optionally, the result value from the execute unit 302 may in some cases also be provided to one or more downstream processing stages, as illustrated by the dashed arrow. The rename storage control circuitry 303 is operable to write the generated result value to the rename storage 304 (specifically, a rename table such as the table 32 stored by the rename storage 304) by writing the generated result value to an entry in the physical register identifier field which is associated with the destination architectural register identifier specified by the given instruction. In addition to writing the result value, the rename storage control circuitry 303 is operable to update a flag value associated with the entry to indicate presence of a result value for the entry that has been written to.

Absence of the early execute condition for the given instruction may for example arise due to at least one source value corresponding to an entry of the rename storage 304 which does not store a result value (e.g. due to being empty or storing a physical register identifier). In response to absence of the early execute condition for the given instruction, the early execute detection circuitry 301 is instead operable to provide the instruction to the PTAG allocation circuitry 305. The PTAG allocation circuitry 305 is operable to select one or more physical register identifiers to associate with one or more architectural register identifiers specified by the instruction. The PTAG allocation circuitry 305 is operable to provide the one or more physical register identifiers to the rename storage control circuitry 303. The rename storage control circuitry 303 is operable to write the one or more physical register identifiers to the rename storage 304. In addition to writing the one or more physical register identifiers, the rename storage control circuitry 303 is operable to update a flag value associated with the one or more entries to indicate presence of a physical register identifier for those entries. The PTAG allocation circuitry 305 is also operable to provide the one or more physical register identifiers to one or more downstream processing stages. For example, the one or more physical register identifiers may be dispatched to the issue stage 10 and/or to the execute stage 12. In this way, the one or more physical register identifiers can be dispatched to at least one subsequent processing stage subsequent to the register rename circuitry to enable execution circuitry to perform the data processing operation specified by the given instruction in order to generate the result value using data values in the physical register file 20 and write the result value to the physical register file.

As shown in FIG. 3, the register rename circuitry may also comprise the dispatch suppression circuitry 306 which can provide a control signal (also referred to as a downstream control signal) to one or more subsequent processing stages subsequent to the register rename circuitry so as to suppress processing by the one or more subsequent processing stages for an instruction for which the early execute condition is present and for which execution is thus performed by the execute unit 302. FIG. 3 shows an example in which the early execute detection circuitry 301 provides a signal to the dispatch suppression circuitry 306 in response to the detection of the presence of the early execute condition in order to control the dispatch suppression circuitry 306 to output the control signal (shown as ctrl) to one or more subsequent processing stages. However, in other examples the early execute detection circuitry 301 may provide the control signal responsive to the detection of the early execute condition without the use of the dispatch suppression circuitry 306.

FIG. 4 schematically illustrates processing operations by the register rename circuitry responsive to a given instruction received by the register rename circuitry. At a step 410, the register rename circuitry receives a given instruction. The register rename circuitry may receive each program instruction of a sequence of program instructions and perform the following operations for each received instruction. At a step 420, the register rename circuitry can be configured to detect whether the early execute condition is present for the given instruction. At a step 430, in response to detecting the early execute condition, the register rename circuitry proceeds to the step 440 at which the execute unit (e.g. execute unit 302) of the register rename circuitry executes the given instruction by performing the data processing operation specified by the given instruction using source values available to the register rename circuitry without accessing the physical register file, with the generated result value being written to the entry of the rename storage associated with the destination architectural register identifier specified by that instruction. At a step 450, the processing operations performed by the register rename circuitry with respect to the given instruction end. Optionally, a further step may be provided between steps 440 and 450 at which the register rename circuitry provides one or more control signals to one or more subsequent processing stages for suppressing processing of the instruction by other subsequent processing stages.

At the step 430, in response to detecting absence of the early execute condition, the register rename circuitry proceeds to the step 460 at which the register rename circuitry selects at least one physical register identifier and writes the physical register identifier to an entry of the rename storage associated with the destination architectural register identifier specified by the given instruction. At a step 470, the register rename circuitry dispatches the instruction to a subsequent processing stage of the processing pipeline for subsequent execution by execution circuitry.

FIG. 5 schematically illustrates an example of processing operations for detection of the early execute condition for a given instruction. Each of the steps 520, 530 and 540 may be performed as part of the step 420 discussed previously for FIG. 4. The operations to discussed with respect to FIG. 5 may be performed for each instruction in an instruction sequence. At a step 510, the register rename circuitry receives a given instruction. At a step 520, the register rename circuitry detects whether each source value required to execute the given instruction is available to the register rename circuitry without accessing the registers in the register file. In response to detecting at the step 520 that each of the one or more source values required to execute the given instruction is available to the register rename circuitry without accessing the plurality of registers, the register rename circuitry proceeds to the step 530.

At the step 530, the register rename circuitry detects whether a processing operation specified by the received instruction is a type of processing operation that is supported by the execute unit. The register rename circuitry can be operable to detect a type of processing operation specified by the received instruction. The execute unit may support one or more types of processing operation comprising one or more arithmetic operations. In some cases, the execute unit may also support one or more logic operations. Examples of supported arithmetic processing operations may be one or more of: addition operations; subtraction operations; multiplication operations; division operations; and raise to the power operations. In response to detecting at the step 530 that the processing operation specified by the received instruction is a type of processing operation that is supported by the execute unit, the register rename circuitry proceeds to the step 540.

At the step 540, the register rename circuitry detects whether an encoding size of the result value to be generated for the received instruction is supported by an entry of the rename storage. In other words, a detection of whether the number of bits required for encoding the result value is supported by an entry of the rename storage is performed. In the example of FIG. 5, the step 540 is performed prior to the execute unit performing the data processing operation specified by the instruction and thus prior to the result value being generated. There are a number of possibilities for detecting whether the result value to be generated for the received instruction will fit within a number of bits provided by an entry of the rename storage prior to the result value being generated. For example, an operation type associated with the data operation specified by the given instruction may be used at the step 540. In particular, for an operation type such as a subtraction operation for performing subtraction of positive values, division operation or square root operation, then it can be known prior to execution by the execute unit that the generated result value will be smaller in size than, or a same size as, a source value used by the execute unit. For example, in response to detecting that a source value (e.g. immediate value or a value stored by the rename storage) has an encoding size smaller than or equal to an encoding size supported by an entry of the rename storage and detecting a type of operation for which a result value is smaller than (or equal to) a source value used to generate the result value, then the register rename circuitry is operable to detect that the encoding size of the result value to be generated for the received instruction is supported by an entry of the rename storage. In some examples in which the source value used by the execute unit is a source value stored by an entry of the rename storage, then in response to detecting a type of processing operation for which a result value is always smaller than a source value, the register rename circuitry detects that the encoding size of the result value to be generated for the received instruction is supported by an entry of the rename storage. In response to detecting at the step 540 that the result value to be generated for the received instruction will fit within a number of bits provided by an entry of the rename storage, the register rename circuitry proceeds to the step 550.

Whilst in the above example reference to the operation generating a smaller result has been made by way of illustration, the same principles may also apply to operations that will generate a result that is a predictable amount larger than the source value, if it can be determined that the source value is smaller than the maximum value that can be stored within an entry of the rename storage by at least that predictable amount. By way of explicit example, an add operation may add 1 to a source value, and if that source value is at least one less than the maximum value that can be stored, it can be determined that the fit condition is met prior to performing the add operation.

At the step 550, in response to the detection of the early execute condition, the execute unit executes the instruction and performs the data processing operation specified by the instruction and writes the generated result value to an entry of the rename storage associated with a destination architectural register identifier specified by the instruction. At the step 560, the processing operations with respect to the received instruction end. As explained above, a further step may be provided between steps 550 and 560 at which the register rename circuitry provides one or more control signals to one or more subsequent processing stages for suppressing processing of the instruction by other subsequent processing stages.

In response to detecting at the step 520 that at least one source value required to execute the given instruction is not available to the register rename circuitry without accessing the plurality of registers, the register rename circuitry proceeds to the step 570. Similarly, in response to detecting at the step 530 that at least one type of operation specified by the instruction is not supported by the execute unit, the register rename circuitry proceeds to the step 570. Similarly, in response to detecting at the step 540 that a number of bits provided by the entry of the rename storage associated with the destination architectural register identifier specified by the instruction is not sufficient to store the result value, the register rename circuitry proceeds to the step 570. At the step 570, the register rename circuitry: selects one or more physical register identifiers to associate with one or more architectural register identifiers specified by the instruction; writes the physical register identifiers to one or more entries of the rename storage associated with the one or more architectural register identifiers; and dispatches the physical register identifiers to a subsequent processing stage for permitting execution of the instruction by execution circuitry, which accesses data values stored in the physical register file 20, at a later stage in the processing pipeline. The operations performed at the step 570 are performed to permit execution of the instruction by execution circuitry later in the processing pipeline, and are performed instead of the execute unit executing the instruction.

In the example of FIG. 5, the early execute condition is shown as comprising three sub-conditions. In some examples, the step 540 may instead be performed after the result value has been generated. The step 540 may therefore be performed based on the result value, for example by comparing the result value with an encoding size of an entry of the rename storage. Further, in some cases the steps 520, 530 and 540 may be performed in a different order to that shown in FIG. 5, or indeed may be performed at least partly in parallel.

FIG. 6 schematically illustrates another detailed view of an example of a register rename circuitry at a rename stage of a processing pipeline. In the example of FIG. 6, a decode stage is shown on the left which provides decoded instructions to the rename stage. An issue stage is shown as being subsequent to the rename stage in the processing pipeline. In the example of FIG. 6, the decoded instruction specifies an immediate value (Imm), a source architectural register identifier (SRC) and a destination architectural register identifier (DST). This example shows a case in which the register rename circuitry comprises adder circuitry 602 for performing an addition type of arithmetic operation. FIG. 6 shows an example in which an immediate value and a value stored in an entry of the rename table 601 are added by the adder circuitry 602. However, similar principles can be applied and in other examples the adder circuitry 602 may add two values stored in two entries of the rename table 601 and/or the adder circuitry 602 may be replaced or supplemented with subtractor circuitry or multiplier circuitry, for example.

The immediate value specified by the decoded instruction is provided to the adder circuitry 602. The source architectural register identifier specified by the decoded instruction is provided to a selection pin of selector circuitry 621 (which may be any suitable type of data selector such as multiplexer circuitry) having input lines coupled to the rename table 601. The selector circuitry 621 thus outputs the value stored by the entry of the rename table 601 associated with the source architectural register identifier. The output of the selector circuitry 621 is provided to the adder circuitry 602. The adder circuitry 602 thus performs an addition operation using the immediate value and the value from the selector circuitry 621. The adder circuitry 602 provides the result value (RES) to selector circuitry 622 (e.g. multiplexer circuitry). As explained later, the selector circuitry 622 can thus provide the result value to the issue stage depending on the signal provided to the selection pin of the selector circuitry 622 by the AND circuitry 604.

The selector circuitry 621 also provides the information output from the entry associated with the source architectural register identifier to flag set detector circuitry 603. The flag set detector circuitry 603 detects the flag value from the provided information associated with the entry associated with the source architectural register identifier. In the example shown in FIG. 6, a flag value of 1 is used to indicate presence of a result value stored by an entry of the rename table 601. The flag set detector 603 thus provides the flag value to the AND circuitry 604.

In addition to providing the result value, the adder circuitry 602 is also operable to provide an overflow flag (OVF). In the example of FIG. 6, the detection of whether the result value will fit within the number of bits supported by an entry of the rename table 601 is performed after the result value is generated. In this example, the adder circuitry 602 is operable to provide the overflow flag so that a value of 1 indicates saturation of the adder circuitry 602 due to the result value exceeding a value range supported by the adder circuitry 602. Hence, in the case of the addition operation by the adder circuitry 602 resulting in an overflow, an overflow flag having a value of 1 is provided from the adder circuitry 602 to inverter circuitry 605. The inverter circuitry 605 thus inverts the overflow flag and provides this to the AND circuitry 604.

Therefore, in the case where the flag value provided by the flag set detector 603 indicates that the value stored by the entry is not a source value (for example by having a value of 0 which instead indicates presence of a physical register identifier and thus indicates that each source value required for the execution is not available at the rename stage without accessing the register file), then the AND circuitry 604 provides a value of 0 to the selection pin of the selector circuitry 622. Alternatively or in addition, in the case where the value provided by the inverter circuitry 605 has a value of 0 (which indicates presence of overflow for the result value generated by the adder circuitry 602), then the AND circuitry 604 provides a value of 0 to the selection pin of the selector circuitry 622. Therefore, in these cases the selector circuitry 622 selects the input line coupled to PTAG allocation circuitry 606. The PTAG allocation circuitry 606 receives the destination architectural register identifier (DST) specified by the instruction and selects a physical register identifier for association with the destination architectural register identifier. The physical register identifier is provided to the selector circuitry 622, such that the selector circuitry 622 outputs the physical register identifier.

As shown in FIG. 6, the physical register identifier can be dispatched to the issue stage and is also provided to selector circuitry 623 (e.g. demultiplexer circuitry) for which the selection pin receives the destination architectural register identifier specified by the instruction, so that the physical register identifier is written to an entry of the rename table 601 associated with the destination architectural register identifier.

In the case where the flag value provided by the flag set detector 603 indicates that the value stored by the entry is a source value (due to having a flag value of 1) and the value provided by the inverter circuitry 605 has a value of 1 (due to no occurrence of overflow at the adder circuitry 602), then the AND circuitry 604 provides a value of 1 to the selection pin of the selector circuitry 622. In this case, the selector circuitry 622 selects to provide the result value to the issue stage, but in one example implementation downstream use of that result value will be suppressed. In addition to this, as shown in FIG. 6 the result value is also provided to the selector circuitry 623 to write the result value to an entry of the rename table 601 associated with the destination architectural register identifier.

In the above specific example of FIG. 6, it is assumed that the given instruction is an add instruction, and hence the required processing operation is supported by the register rename circuitry due to the provision of the add circuitry 602. In a more general case, as discussed earlier, part of detecting the presence of the early execute condition may involve a determination that the instruction specifies an operation that can be performed by the execute unit provided within the register rename circuitry.

The techniques of the present disclosure can in one example implementation be usefully employed in association with execution of loops of code by the processing pipeline in the data processing apparatus. In particular, the execute unit of the register rename circuitry can be particularly suited for execution of instructions in an iterative code block. The above discussion refers to the use of a rename storage (e.g. rename table 32 and 601) for storing result values generated by the execute unit. In addition to the rename storage, condition flag rename storage may also be provided at the rename stage and accessible to the register rename circuitry so that instructions that evaluate one or more condition codes based on one or more condition flags can be executed by the execute unit of the register rename circuitry.

The following is an example of a block of code for which execution of at least some of the instructions can be performed by the execute unit in the rename stage, in accordance with one example implementation:

mov w20, wzr
mov w19, #255
.loop:
[ . . . ]
Add w20, w20, #1
cmp w19, w20
b.ne .loop The execute unit is operable to execute the instruction mov w20, wzr so that a value of 0 from a zero register wzr is stored to the entry of the rename storage associated with architectural register w20. The value of zero is thus stored in the rename storage (e.g. rename table 32) and is available to the register rename circuitry. The execute unit is also operable to execute the instruction mov w19, #255 so that the immediate value 255 (in this example a maximum value that can be accommodated by the physical register identifier field of an entry in the rename table) is stored to the entry of the rename storage associated with w19. The values 0 and 255 can thus be made available to the register rename circuitry.

A loop of a block of iterative code can then be executed, which may comprise a number of instructions specifying arithmetic operations. At the end of the loop, the execute unit executes the instruction Add w20, w20, #1 to perform an arithmetic addition of the value 1 to the value stored in the entry of the rename storage associated with w20, so that on a first iteration the entry is updated to store the value 1.

The compare instruction cmp w19, w20 is then executed to perform a comparison operation on the values stored in the entries associated with w19 and w20. This compare instruction may be executed at the execution stage 12 of the pipeline, but could in one example implementation be executed at the rename stage if the execute unit supports that operation, and the rename stage provides a suitable storage structure to store the one or more condition flags produced. Irrespective of where the instruction is executed the values associated with w19 and w20 can be obtained from the rename table. The execution of the compare instruction does not generate a normal data result value but instead generates a condition flag to be stored in a condition flag register. If condition flag rename storage is provided at the rename stage and the execute unit supports execution of the compare instruction, then the compare instruction can be executed in the rename stage by causing the execute unit to perform an operation for comparing the values associated with entries w19 and w20 in the rename storage and generating one or more condition flags to be stored to an entry in the condition flag rename storage available to the register rename circuitry in dependence on the comparison.

As explained above, in addition to the rename table 32 shown in FIG. 1, in some examples a condition flag rename table may also be provided comprising at least one entry for storing one or more values of one or more condition flags which are available to the register rename circuitry. The condition flag can thus be generated and stored to the condition flag rename storage for indicating the result of the comparison responsive to execution of the compare instruction. Specifically, a value of the condition flag may indicate whether the values associated with w19 and w20 have been determined as being equal or not.

The branch instruction b.ne .loop can then be executed to evaluate one or more condition codes based on values of one or more condition flags stored in the condition flag rename storage and branch to the start of the loop of the block of iterative code depending on that evaluation. In one example implementation, the branch instruction is executed at the execution stage 12 of the pipeline, but could in principle, at least partly, be executed at the rename stage if the execute unit supports execution of such an operation. For the case in which execution of the compare instruction indicates that w20 stores a value less than w19, the one or more condition flags can be set so that execution of the branch instruction causes branching to the start of the loop. In one example implementation where both the compare instruction and the branch instruction can be executed at the rename stage, condition codes can be available to the register rename circuitry and the execute unit can execute instructions that evaluate one or more condition codes. In such an implementation, at the rename stage of the processing pipeline, instructions can be executed that evaluate one or more conditions for controlling execution of loops of iterative code. Instructions included in the loop for which the early execute condition is detected can be executed by the execute unit to generate result values which are stored to the entries of the rename storage.

Hence, it can be seen that on each iteration of the loop the add instruction indicated above can be executed at the rename stage, at least until the result reaches the value 255, and in some instance the compare instruction may also be executed at the rename stage. Indeed it is possible in some implementations that the branch instruction could also, at least partly, be executed at the rename stage.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

Other example arrangements are set out in the following clauses:

Clause 1. An apparatus comprising:
execution circuitry to execute instructions in order to perform data processing operations specified by those instructions;
a plurality of registers to store data values for access by the execution circuitry when performing the data processing operations, each register having an associated physical register identifier;
register rename circuitry to select physical register identifiers to associate with architectural register identifiers specified by the instructions; and
rename storage having a plurality of entries, each entry being associated with one of the architectural register identifiers and used by the register rename circuitry to indicate a physical register identifier selected for association with that one of the architectural register identifiers;
the register rename circuitry comprising an execute unit, and being responsive to detection of an early execute condition for a given instruction, the early execute condition requiring at least detection that each source value required to execute the given instruction is available to the register rename circuitry without accessing the plurality of registers, to cause the execute unit to perform the data processing operation specified by the given instruction in order to generate a result value, and to cause the generated result value to be stored in an entry of the rename storage associated with a destination architectural register identifier specified by the given instruction.

Clause 2. The apparatus according to clause 1, further comprising:
early execute condition detection circuitry configured to determine whether the early execute condition is present for the given instruction;
wherein the register rename circuitry is provided in a given pipeline stage of a pipelined processor, and in the presence of the early execute condition the early execute condition detection circuitry is arranged to suppress processing of the given instruction by one or more pipeline stages subsequent to the given pipeline stage.

Clause 3. The apparatus according to clause 2, wherein:
the execute unit is capable of performing one or more data processing operations, the one or more data processing operations being a subset of the data processing operations capable of being performed by the execution circuitry; and the detection of the early execute condition for the given instruction by the early execute condition detection circuitry further requires detection that the data processing operation specified by the given instruction is one of the one or more data processing operations capable of being performed by the execute unit.

Clause 4. The apparatus according to clause 2 or clause 3, wherein the detection of the early execute condition for the given instruction by the early execute condition detection circuitry further requires presence of a result fit condition, the result fit condition requiring that a number of bits provided by the entry of the rename storage associated with the destination architectural register identifier is sufficient to store the result value.

Clause 5. The apparatus according to clause 4, wherein the early execute condition detection circuitry is arranged to determine whether the result fit condition is present prior to the execute unit performing the data processing operation specified by the given instruction.

Clause 6. The apparatus according to clause 5, wherein the early execute condition detection circuitry is arranged to determine, prior to the execute unit performing the data processing operation specified by the given instruction, whether the result fit condition is present in dependence on at least one of the operation type associated with the data processing operation specified by the given instruction, and at least one source value used when executing the given instruction.

Clause 7. The apparatus according to clause 4, wherein the early execute condition circuitry is arranged, when determination of the presence of the result fit condition requires the data processing operation specified by the given instruction to be performed, but all other requirements for the early execute condition have been detected, to trigger the execute unit to perform the data processing operation specified by the given instruction in order to generate the result value, and to determine that the early execute condition is present when the result fit condition is determined to be present based on the result value.

Clause 8. The apparatus according to any preceding clause, wherein each of the plurality of entries in the rename storage supports a given number of bits that is greater than a number of bits required for specifying the physical register identifiers for the plurality of registers.

Clause 9. The apparatus according to any preceding clause, wherein the register rename circuitry is responsive to absence of the early execute condition for the given instruction, to select a physical register identifier to associate with a destination architectural register identifier specified by the given instruction and write the physical register identifier to the entry of the rename storage associated with the destination architectural register identifier, and wherein the rename circuitry is configured to dispatch the physical register identifier selected for the given instruction to a processing stage subsequent to the register rename circuitry to enable the execution circuitry to perform the data processing operation specified by the given instruction in order to generate the result value.

Clause 10. The apparatus according to any preceding clause, wherein the execute unit comprises an arithmetic logic unit configured to perform an arithmetic operation.

Clause 11. The apparatus according to clause 10, wherein the arithmetic logic unit comprises at least one of adder circuitry, subtractor circuitry and adder-subtractor circuitry.

Clause 12. The apparatus according to any preceding clause, wherein the detection that each source value required to execute the given instruction is available to the register rename circuitry comprises detection that each source value required to execute the given instruction is one of an immediate value specified by the given instruction and a value stored in an entry of the rename storage associated with a source architectural register identifier specified by the given instruction.

Clause 13. The apparatus according to any preceding clause, wherein in response to the given instruction specifying a source architectural register identifier, the execute unit is configured to perform the data processing operation specified by the given instruction using a source value previously written to an entry of the rename storage associated with the source architectural register identifier.

Clause 14. The apparatus according to any preceding clause, wherein in response to the given instruction specifying an immediate value, the execute unit is configured to perform the data processing operation specified by the given instruction using the immediate value.

Clause 15. The apparatus according to any preceding clause, wherein in response to the given instruction specifying a first source architectural register identifier and a second source architectural register identifier, the execute unit is configured to perform the data processing operation specified by the given instruction using a first source value previously written to an entry of the rename storage associated with the first source architectural register identifier and a second source value previously written to an entry of the rename storage associated with the second source architectural register identifier.

Clause 16. The apparatus according to any preceding clause, wherein the given instruction is an instruction that evaluates one or more condition codes based on values of one or more condition flags stored in a condition code rename storage within the register rename circuitry.

Clause 17. The apparatus according to clause 16, wherein the given instruction is arranged to update at least one of the one or more condition flags stored in the condition code rename storage within the register rename circuitry based on evaluation of one or more source values that are available to the register rename circuitry without accessing the plurality of registers.

Clause 18. A non-transitory computer-readable medium to store computer-readable code for fabrication of the apparatus according to any preceding clause.

Clause 19. A method comprising:
detecting an early execute condition for a given instruction, the early execute condition requiring at least detection that each source value required to execute the given instruction is available to register rename circuitry without accessing registers storing data values for access by execution circuitry when performing data processing operations specified by instructions; and
in response to detecting the early execute condition for the given instruction:
performing, by an execute unit included in the register rename circuitry, a data processing operation specified by the given instruction in order to generate a result value, and writing the generated result value in an entry of rename storage, the entry being associated with a destination architectural register identifier specified by the given instruction, the rename storage comprising a plurality of entries, each entry being associated with one architectural register identifier specified by the instructions and capable of being used to indicate a physical register identifier selected for association with that one architectural register identifier.

The invention claimed is:

1. An apparatus comprising:
   execution circuitry to execute instructions in order to perform data processing operations specified by those instructions;
   a plurality of registers to store data values for access by the execution circuitry when performing the data processing operations, each register having an associated physical register identifier;
   register rename circuitry to select physical register identifiers to associate with architectural register identifiers specified by the instructions; and
   rename storage having a plurality of entries, each entry being associated with one of the architectural register identifiers and used by the register rename circuitry to indicate a physical register identifier selected for association with that one of the architectural register identifiers;
   the register rename circuitry comprising an execute unit, and being responsive to detection of an early execute condition for a given instruction, the early execute condition requiring at least detection that each source value required to execute the given instruction is available to the register rename circuitry without accessing the plurality of registers, to cause the execute unit to perform the data processing operation specified by the given instruction in order to generate a result value, and to cause the generated result value to be stored in an entry of the rename storage associated with a destination architectural register identifier specified by the given instruction.

2. The apparatus according to claim 1, further comprising:
   early execute condition detection circuitry configured to determine whether the early execute condition is present for the given instruction;
   wherein the register rename circuitry is provided in a given pipeline stage of a pipelined processor, and in the presence of the early execute condition the early execute condition detection circuitry is arranged to suppress processing of the given instruction by one or more pipeline stages subsequent to the given pipeline stage.

3. The apparatus according to claim 2, wherein:
   the execute unit is capable of performing one or more data processing operations, the one or more data processing operations being a subset of the data processing operations capable of being performed by the execution circuitry; and
   the detection of the early execute condition for the given instruction by the early execute condition detection circuitry further requires detection that the data processing operation specified by the given instruction is one of the one or more data processing operations capable of being performed by the execute unit.

4. The apparatus according to claim 2, wherein the detection of the early execute condition for the given instruction by the early execute condition detection circuitry further requires presence of a result fit condition, the result fit condition requiring that a number of bits provided by the entry of the rename storage associated with the destination architectural register identifier is sufficient to store the result value.

5. The apparatus according to claim 4, wherein the early execute condition detection circuitry is arranged to determine whether the result fit condition is present prior to the execute unit performing the data processing operation specified by the given instruction.

6. The apparatus according to claim 5, wherein the early execute condition detection circuitry is arranged to determine, prior to the execute unit performing the data processing operation specified by the given instruction, whether the result fit condition is present in dependence on at least one of the operation type associated with the data processing operation specified by the given instruction, and at least one source value used when executing the given instruction.

7. The apparatus according to claim 4, wherein the early execute condition circuitry is arranged, when determination of the presence of the result fit condition requires the data processing operation specified by the given instruction to be performed, but all other requirements for the early execute condition have been detected, to trigger the execute unit to perform the data processing operation specified by the given instruction in order to generate the result value, and to determine that the early execute condition is present when the result fit condition is determined to be present based on the result value.

8. The apparatus according to claim 1, wherein each of the plurality of entries in the rename storage supports a given number of bits that is greater than a number of bits required for specifying the physical register identifiers for the plurality of registers.

9. The apparatus according to claim 1, wherein the register rename circuitry is responsive to absence of the early execute condition for the given instruction, to select a physical register identifier to associate with a destination architectural register identifier specified by the given instruction and write the physical register identifier to the entry of the rename storage associated with the destination architectural register identifier, and wherein the register rename circuitry is configured to dispatch the physical register identifier selected for the given instruction to a processing stage subsequent to the register rename circuitry to enable the execution circuitry to perform the data processing operation specified by the given instruction in order to generate the result value.

10. The apparatus according to claim 1, wherein the execute unit comprises an arithmetic logic unit configured to perform an arithmetic operation.

11. The apparatus according to claim 10, wherein the arithmetic logic unit comprises at least one of adder circuitry, subtractor circuitry and adder-subtractor circuitry.

12. The apparatus according to claim 1, wherein the detection that each source value required to execute the given instruction is available to the register rename circuitry comprises detection that each source value required to execute the given instruction is one of an immediate value specified by the given instruction and a value stored in an entry of the rename storage associated with a source architectural register identifier specified by the given instruction.

13. The apparatus according to claim 1, wherein in response to the given instruction specifying a source architectural register identifier, the execute unit is configured to perform the data processing operation specified by the given instruction using a source value previously written to an entry of the rename storage associated with the source architectural register identifier.

14. The apparatus according to claim 1, wherein in response to the given instruction specifying an immediate value, the execute unit is configured to perform the data processing operation specified by the given instruction using the immediate value.

15. The apparatus according to claim 1, wherein in response to the given instruction specifying a first source architectural register identifier and a second source architectural register identifier, the execute unit is configured to perform the data processing operation specified by the given instruction using a first source value previously written to an entry of the rename storage associated with the first source architectural register identifier and a second source value previously written to an entry of the rename storage associated with the second source architectural register identifier.

16. The apparatus according to claim 1, wherein the given instruction is an instruction that evaluates one or more condition codes based on values of one or more condition flags stored in a condition flag rename storage within the register rename circuitry.

17. The apparatus according to claim 16, wherein the given instruction is arranged to update at least one of the one or more condition flags stored in the condition flag rename storage within the register rename circuitry based on evaluation of one or more source values that are available to the register rename circuitry without accessing the plurality of registers.

18. A non-transitory computer-readable medium to store computer-readable code for fabrication of an apparatus comprising:
   execution circuitry to execute instructions in order to perform data processing operations specified by those instructions;
   a plurality of registers to store data values for access by the execution circuitry when performing the data processing operations, each register having an associated physical register identifier;
   register rename circuitry to select physical register identifiers to associate with architectural register identifiers specified by the instructions; and
   rename storage having a plurality of entries, each entry being associated with one of the architectural register identifiers and used by the register rename circuitry to indicate a physical register identifier selected for association with that one of the architectural register identifiers;
   the register rename circuitry comprising an execute unit, and being responsive to detection of an early execute condition for a given instruction, the early execute condition requiring at least detection that each source value required to execute the given instruction is available to the register rename circuitry without accessing the plurality of registers, to cause the execute unit to perform the data processing operation specified by the given instruction in order to generate a result value, and to cause the generated result value to be stored in an entry of the rename storage associated with a destination architectural register identifier specified by the given instruction.

19. A method comprising:
detecting an early execute condition for a given instruction, the early execute condition requiring at least detection that each source value required to execute the given instruction is available to register rename circuitry without accessing registers storing data values for access by execution circuitry when performing data processing operations specified by instructions; and
in response to detecting the early execute condition for the given instruction:
performing, by an execute unit included in the register rename circuitry, a data processing operation specified by the given instruction in order to generate a result value, and writing the generated result value in an entry of rename storage, the entry being associated with a destination architectural register identifier specified by the given instruction, the rename storage comprising a plurality of entries, each entry being associated with one architectural register identifier specified by the instructions and capable of being used to indicate a physical register identifier selected for association with that one architectural register identifier.

* * * * *